United States Patent [19]

Ishikawa et al.

[11] Patent Number: 4,480,734
[45] Date of Patent: Nov. 6, 1984

[54] HYDRAULICALLY OPERATIVE CLUTCH TYPE TRANSMISSION

[75] Inventors: Norikatsu Ishikawa, Takahama; Choji Furusawa, Toyota, both of Japan

[73] Assignee: Aisin Seiki Kabushiki Kaisha, Kariya, Japan

[21] Appl. No.: 395,927

[22] Filed: Jul. 7, 1982

[30] Foreign Application Priority Data

Jul. 7, 1981 [JP] Japan .................. 56-106065

[51] Int. Cl.³ .................. F16D 25/10; F16D 13/76; F16D 23/14
[52] U.S. Cl. .................. 192/20; 192/53 F; 192/109 R; 192/110 R
[58] Field of Search ........... 192/109 R, 110 R, 110 B, 192/20, 21, 51, 53 F, 87.1, 87.11, 87.12, 87.13, 87.14, 87.15, 87.16, 87.17, 87.18, 87.19

[56] References Cited

U.S. PATENT DOCUMENTS

| 3,093,007 | 6/1963 | Aebersold | 192/109 R |
| 3,254,541 | 6/1966 | Schou |  |
| 3,478,852 | 11/1969 | Fuehrer et al. | 192/87.16 X |
| 3,700,083 | 10/1972 | Ashikawa et al. | 192/53 F |
| 3,894,621 | 7/1975 | Quick | 192/109 |
| 4,187,936 | 2/1980 | Davenport | 192/21 |
| 4,189,038 | 2/1980 | Hurst | 192/21 |

FOREIGN PATENT DOCUMENTS 863651  3/1961  United Kingdom ............ 192/87.14

Primary Examiner—George H. Krizmanich
Attorney, Agent, or Firm—Oblon, Fisher, Spivak, McClelland & Maier

[57] ABSTRACT

A hydraulically operative clutch type transmission especially for industrial and loading vehicles comprises a casing accommodating shift gear mechanism therein, a housing connected to the casing, an input shaft journalled to the housing, a main shaft connected to the input shaft, a gearing member, a hydraulically operative clutch device which comprises a clutch drum connected to the main shaft and a clutch hub connected to the gearing member, a washer plate interposed between the gearing member and sleeve end of the clutch drum, the main shaft including a large diameter portion having a notch with a plain surface, and a small diameter portion, a gear member of the gearing member being rotatably supported on the large diameter portion, the clutch drum mounted on the small diameter portion, and the washer plate including a fasting portion which is engaged with the notch.

4 Claims, 3 Drawing Figures

HYDRAULICALLY OPERATIVE CLUTCH TYPE TRANSMISSION

BACKGROUND OF THE INVENTION

1. Field of the Invention

The present invention relates to a hydraulically operative clutch type transmission especially for industrial and loading vehicles, and more particularly to an improvement in a hydraulically operative clutch type transmission having a gearing means actuated by a hydraulically operative clutch device.

2. Description of the Prior Art

Conventionally, hydraulically operative clutch type transmissions mentioned above have been proposed as disclosed in, for example, the U.S. Pat. No. 3,254,541 issued on June 7, 1966. In such prior transmissions, however, a clutch drum of a hydraulically operative clutch device may be secured to a main shaft and, therefore, the clutch device can not move on the main shaft in its axial direction. Thus, the main shaft receives an undesirable thrust force which is caused to be generated by the operation of the clutch device.

SUMMARY OF THE INVENTION

It is, therefore, an object of the present invention to provide a new and improved hydraulically operative clutch type transmission which obviates the prior disadvantage mentioned above.

It is another object of the present invention to provide a new and improved hydraulically operative clutch type transmission which is easy in assembling and is simple in construction.

According to the present invention, a hydraulically operative clutch type transmission comprises a casing accommodating a shift gear mechanism therein, a housing connected to the casing, an input shaft journalled to the housing, a main shaft connected to the input shaft at one end thereof and journalled to the casing, a hydraulically operative clutch device mounted on the main shaft, a gearing member for transmitting power, and a washer plate interposed between the gearing member and sleeve end of a clutch drum of the hydraulically operative clutch device and fastened on the main shaft.

The above and other objects, features and advantages of the present invention will become more apparent from the following description when taken in conjunction with the accompanying drawings in which a preferred embodiment of the present invention is shown.

DETAILED DESCRIPTION OF THE PREFERRED EMBODIMENT

Figure 1:
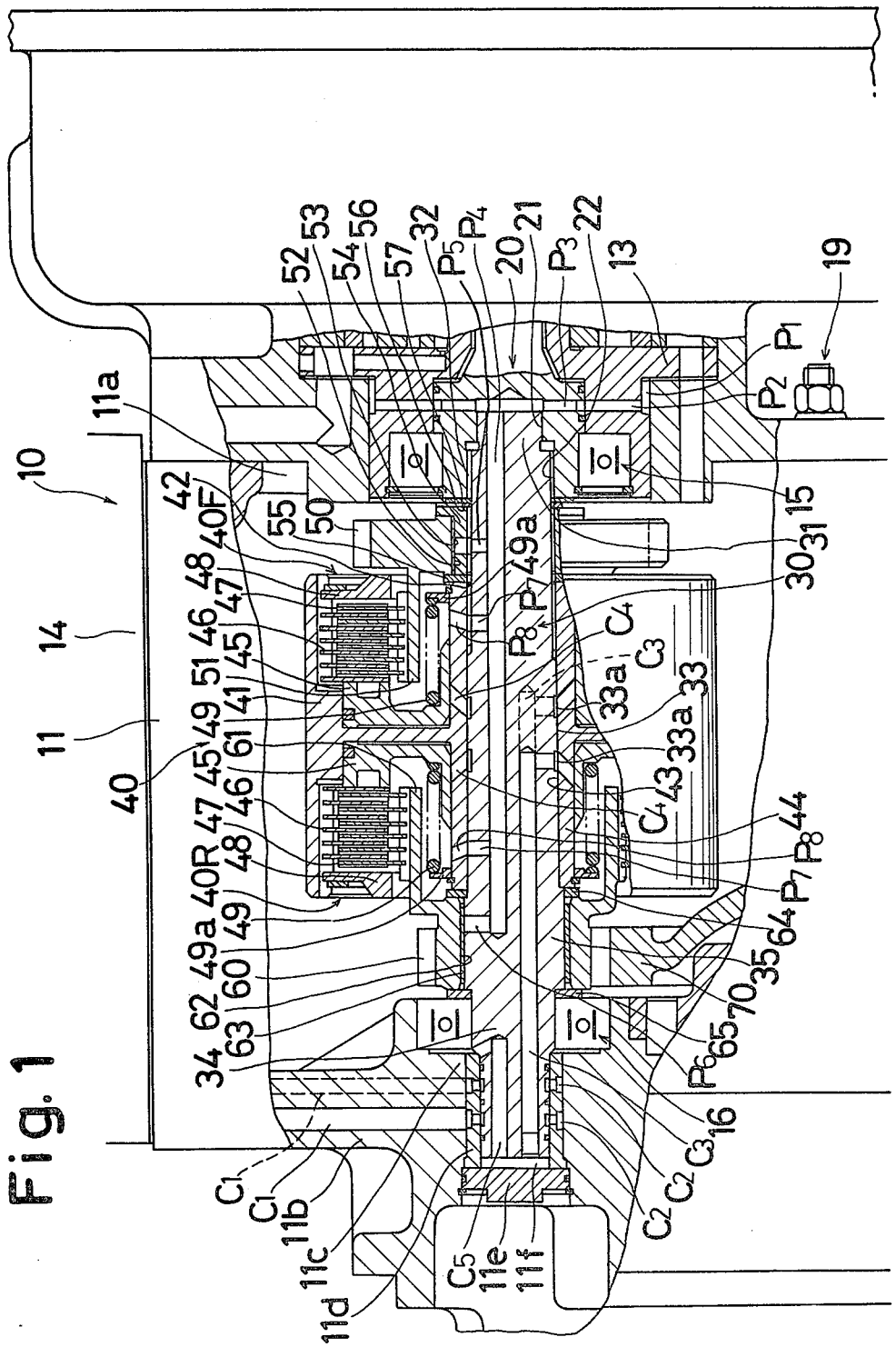
FIG. 1 is a partly diagrammatic sectional view of a hydraulically operative clutch type transmission according to an embodiment of the present invention.
Figure 2:
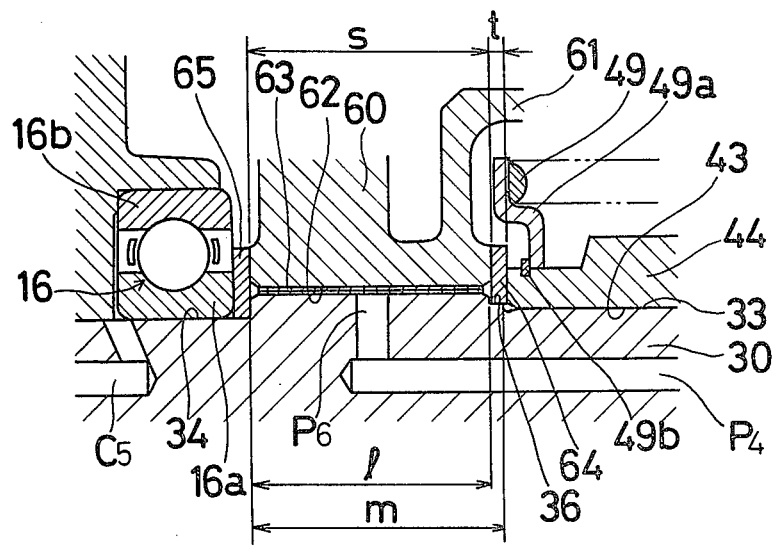
FIG. 2 is a partially enlarged detailed view of FIG. 1.
Figure 3:
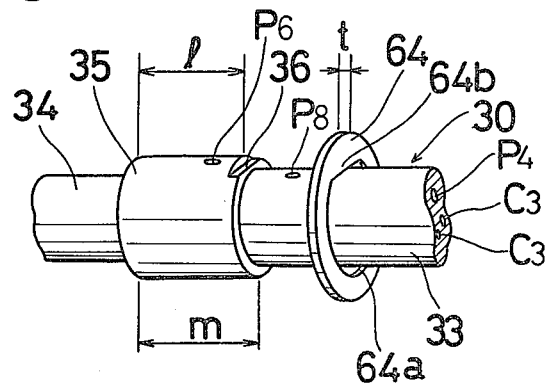
FIG. 3 is a partial prespective view of main shaft of FIG. 1.

As shown in FIGS. 1 through 3, a hydraulically operative clutch type transmission 10 includes a casing 11 having an opening 11a, a housing 12 which is connected to the casing 11 by means of screw members 19 so as to cover the opening 11a and so as to accommodate a stator shaft 13 for torque converter (not shown) therein, an input shaft 20 which is journalled to the stator shaft 13 by means of an antifriction bearing 15 and which has first and second bores 21 and 22, a main shaft 30 which is received within the bore 21 at one end portion 31 thereof and is received within the bore 20 to be splined to the input shaft 20 at a spline portion 32 thereof and which is journalled to a boss portion 11c formed on a side wall 11b of the casing 11 by means of an antifriction bearing 16, a hydraulically operative clutch device 40 mounted on the main shaft 30, and gear members 50 and 60 directly or indirectly meshed with an output gear 70.

The main shaft 30 includes a small diameter portion 33, a large diameter portion 35, and another small diameter portion 34 which is inserted into an inner-race 16a of bearing 16.

The clutch device 40 is selectively operated by a control arrangement 14 which is installed on upper portion of the case 11. The clutch device 40 includes a clutch drum 41 having a sleeve portion 44 which is installed on the small diameter portion 33 at an internal portion 43 thereof and which is connected to the spline shaft portion 32 at splines 42 thereof, pistons 45 slidably mounted in a cylinder of the clutch drum 41, a plurality of clutch plates 46 mounted in the clutch drum 41 and being movable only in an axial direction, a plurality of clutch discs 47 arranged between the clutch plates, pressure plates 48 fixed in the clutch drum 41, return springs 49 fitted between the pistons 45 and retainers 49d which are fastened on the sleeve portion 44 by means of snap rings, respectively.

The clutch device 40 is energized by pressurized fluid transmitted from the control arrangement 14 to the pistons 45 and 45, through means of passageways $C_1$ and $C_1$ formed in the casing 11, passageways $C_2$ and $C_2$ formed in a collar member 11d which is inserted into the boss portion 11c of the casing 11, passageways $C_3$ and $C_3$ formed in the main shaft 30, grooves 33a and 33a formed in the main shaft 30, apertures $C_4$ and $C_4$ formed in the sleeve portion 44 of the clutch drum 41.

The collar member 11d is prevented from falling out from the boss portion 11c by a plug 11e which is hermetically secured to the casing by means of snap ring and sealingly and rotatably receives the left end portion of the main shaft 30.

Pressurized fluid in passageways $C_2$ and $C_2$ leaks out in cavity 11f defined by the plug 11e, the collar member 11d and the left-side surface of the main shaft 30, through means of between the collar member 11d and the main shaft 30. The fluid stayed in the cavity 11f is led to the antifriction bearing 16 through a passageway $C_5$, and functions as lubrication oil.

The gear members 50 and 60 have clutch hubs 51 and 61 which support a plurality of clutch discs 47 which in turn are movable only in the axial direction, respectively.

The gear member 50 is for a forward mode of the transmission and is meshed with a counter gear formed on a counter shaft (not shown) which is drivingly connected to the output gear 70 through other gear formed on the counter shaft (not shown).

A sliding bearing 53 is securely inserted into an inner periphery 52 of the gear member 50 and is rotatably supported on an outer periphery of a race member 54 which is splined to the spline shaft portion 32.

A washer 55 is interposed between the right-side surface of the sleeve portion 44 and the left side surfaces of both of the gear member 50 and the race member 54, and is splined to the spline shaft portion 32.

A washer 57 is interposed between the left side surface of the input shaft 20 and a snap ring 56 which is fastened on the main shaft 30 at the right side portion of the race member 54, and is splined to the spline shaft portion 32.

The gear member 60 is for reverse mode of the transmission and is meshed with the output gear 70. The gear member 60 is rotatably supported on an outer periphery of the large diameter portion 35 through a sliding bearing 63 which is securely inserted into an inner periphery 62 of the gear member 60.

The diameter of the large diameter portion 35 is larger than that of the small diameter portion 33 and also that of another small diameter portion 34. However, the diameter of the small diameter portion 33 may be larger than that of another small diameter portion 34 and vice versa.

A notch 36 having a plain surface is formed in outer periphery of the end portion of the large diameter portion 35 in face of sleeve portion 44 as shown in FIG. 2 and FIG. 3. The distance between the plain surface of the notch 36 and the center of the main shaft 30 is larger than the radius of the small diameter portion 33, but smaller than the radius of the large diameter portion 35. The length "l" between the right side shoulder of the large diameter portion 35 defining notch 36 and the left side surface of the large diameter portion 35 is smaller than the length "s" of the gear member 60 as shown in FIG. 2.

A washer plate 64 is interposed between the right side surface of the gear 60 and left side surface of the sleeve portion 44, and engages with the notch 36 at a flat portion 64b which is formed on inner periphery portion 64a thereof. The washer plate 64 is mounted on the outer periphery of large diameter portion 35 at the inner periphery portion 64a thereof. Therefore, the washer plate 64 is fastened on the main shaft 30 in its rotating direction, but might be movable in its axial direction.

It is determined that the sum of thickness "t" of the washer plate 64 and length "s" of the gear member 60 is larger than the length "m" of the large diameter portion 35. Accordingly, thrust force caused to be generated by the operations of the gear member 60 and/or the clutch drum 41 may not act upon the main shaft 30.

A thrust plate 65 is interposed between the gear member 60 and the inner-race 16a of antifriction bearing 16.

The lubrication oil is supplied to the relative rotatable slide portions of the sliding bearings 53 and 63 from an oil pressure source through means of annular passageway $P_1$ which is defined by the housing 12 and the stator shaft 13, passageway $P_2$ formed in the stator shaft 13, passageway $P_3$ formed in the input shaft 20, passageway $P_4$ formed in the main shaft, branch passageways $P_5$ and $P_6$. The lubrication oil in passageway $P_4$ also is supplied to the cavities of the clutch device 40 through further branch passageways $P_7$ and $P_7$ formed in the main shaft 30, passageways $P_8$ and $P_8$ formed in the sleeve portion 44 of the clutch drum 41. Accordingly, each of slide portions between the sliding bearings 53 and 63, outer periphery of the large diameter portion 35, race member 54, and the washers 55, 64 and 65 may be sufficiently lubricated.

The antifriction bearing 15 may be lubricated by some of the lubricating oil which is leaked from between the passageway $P_2$ and the passageway $P_3$. It should be noted that the above parts 41, 54, 55, 57 and 64 may be prevented from rotating on the main shaft 31 but might be movable in their axial direction.

The operation of the above described hydraulically operative clutch type transmission according to the present invention is as follows:

The clutch plates 46 and the clutch discs 47 of the forward clutch 40F are pressed between piston 45 and pressure plate 48 as a result of pressurized fluid acting on the piston 45 of the forward clutch 40F of the clutch device 40. Therefore, the clutch hub 51 is brought in engagement with the clutch drum 41, and then the power transmitted from input shaft 20 to main shaft 30 flows to the output gear 70 through means of clutch drum 41, clutch plates 46, clutch discs 47, clutch hub 51, gear member 50, and counter gears (not shown) to thereby complete the forward mode of the transmission.

When the pressurized fluid acting on the piston 45 of the forward clutch 40F is discharged, and the pressurized fluid acts on the piston 45 of the reverse clutch 40R of the clutch device 40, the clutch hub 61 is brought in engagement with the clutch drum 41 in the same manner as that of the forward mode of transmission mentioned above. Now, the power is transmitted from input shaft 20 to output shaft 70 through means of main shaft 30, clutch drum 41, clutch plates 46, clutch discs 47, clutch hub 61, and gear member 60, to thereby complete the reverse mode of the transmission. One of gear members 50 and 60 is maintained under driving condition and is being rotated together with main shaft 30, while the other of gear members 50 and 60 is maintained under undriving condition and is being relatively rotated against main shaft 30.

The assembly of the hydraulically operative clutch type transmission includes the following steps:

1. Outside of the casing 11, clutch device 40, gear member 50, washers 54 and 55, snap ring 56, washer 57, gear member 60, washers 64 and 65, and antifriction bearing 16 are positioned on the main shaft, respectively, as shown in FIG. 1 to have suitable sub-assembly.

2. Suitable sub-assembly of the parts mentioned above is being inserted into the cavity of the casing 11 through the opening 11a from right-hand direction in FIG. 1, and then the left end portion 34 of the main shaft 30 is inserted into the collar member 11d, while outer-race 16 of the antifriction bearing 16 is inserted into the boss portion 11c of the casing 11. During this step of the assembly, the left end of clutch device 40 is in contact with the shoulder of washer plate 64 at the sleeve portion 44 thereof, while the right end of clutch device 40 is in contact with the race member 54 through washer 55 and, therefore, the clutch device which is relatively heavy can not move on the main shaft 30.

3. The stator shaft 13, the input shaft 20, and antifriction bearing 15 are independently arranged within the housing 12, and then the spline shaft portion 32 is being splined to the bore 22 of the input shaft 20, thereafter the housing 12 is being connected to the casing 11 by means of the screw members 19.

What is claimed is:

1. A hydraulically operative clutch type transmission comprising;
   a casing accommodating shift gear mechanism therein,
   a housing connected to said casing so as to close an opening formed in an axial portion of said casing and accommodating a coupling device to transmit power from engine therein,
   an input shaft journalled to said housing by means of an antifriction bearing, a main shaft connected to said input shaft at one end thereof and journalled to a boss portion formed in side wall of said casing by means of an antifriction bearing, a hydraulically operative clutch device mounted on said main shaft and energized by pressurized fluid which is transmitted by a control arrangment provided on said casing through a passageway formed in said main shaft, a gearing means for transmitting power to an output member from said clutch device, said clutch device further comprising a clutch drum mounted on said main shaft and a clutch hub connected to said gearing means, a washer plate interposed between said gearing means and a sleeve end of said clutch drum and fastened on said main shaft only in its rotatable direction.

2. A hydraulically operative clutch type transmission according to claim 1, wherein said main shaft includes a large diameter portion which has a notch with a plain surface and which rotatably supports gear member of said gearing means, a small diameter portion on which said clutch drum is mounted and another small diameter portion which is supported by an inner-race of said antifriction bearing provided for said main shaft, and wherein said washer plate includes a fasting portion which is engaged with said notch.

3. A hydraulically operative clutch type transmission according to claim 2, further comprising a thrust plate which is interposed between said gear member and said inner-race, and wherein said gear member includes a sliding bearing which slidingly rotates on said large diameter portion.

4. A hydraulically operative clutch type transmission according to claim 3, wherein a length "l" of said large diameter portion except for a width of said notch is smaller than a length "s" of said gear member, and a length "m" of said large diameter portion is smaller than the sum of the length "s" of said gear member and a thickness "t" of said washer plate.

* * * * *

UNITED STATES PATENT AND TRADEMARK OFFICE
CERTIFICATE OF CORRECTION

PATENT NO. : 4,480,734
DATED : November 6, 1984
INVENTOR(S) : ISHIKAWA ET AL

It is certified that error appears in the above-identified patent and that said Letters Patent is hereby corrected as shown below:

Column 1, line 20, change "can not" to --cannot--.

Column 1, line 57, change "prespective" to --perspective--.

Column 2, line 38, change "30," to --30, and--.

Column 2, line 48, delete "between".

Column 2, line 49, change "stayed" to --remaining--.

Column 2, line 59, change "other" to --another--.

Column 2, line 64, change "which" to --and--.

Column 2, line 65, change "right-side" to --right side--.

Column 3, line 25, change "shoulder" to --surface--.

Column 3, line 53, change "branch" to --and branch--.

UNITED STATES PATENT AND TRADEMARK OFFICE
CERTIFICATE OF CORRECTION

PATENT NO. : 4,480,734

DATED : November 6, 1984

INVENTOR(S) : ISHIKAWA ET AL

Page 2 of 2

It is certified that error appears in the above-identified patent and that said Letters Patent is hereby corrected as shown below:

Column 3, line 57, change "passageways" to --and passageways--.

Column 4, line 41, change "right-hand" to --right hand--.

Column 4, line 51, change "can not" to --cannot--.

Column 4, line 55, change "20," to --20;--.

Column 4, line 56, change "the housing 12 is being" to --housing 12 is--.

Column 4, line 60, change "comprising;" to --comprising:--.

Column 5, line 19, change "claim 1," to --claim 1, and--.

Signed and Sealed this

Second Day of July 1985

[SEAL]

Attest:

DONALD J. QUIGG

Attesting Officer

Acting Commissioner of Patents and Trademarks